Feb. 13, 1923.

G. KAISER.
TRANSMISSION MECHANISM.
FILED MAR. 2, 1921.

INVENTOR:
GEORGE KAISER
BY John W. Bruninga
HIS ATTORNEY.

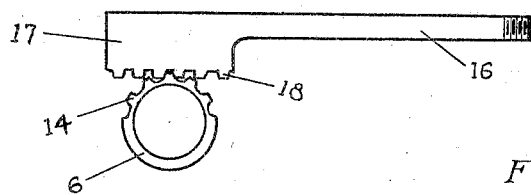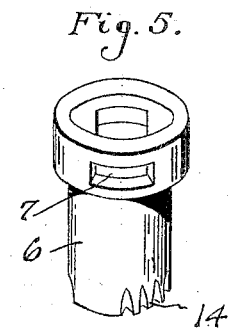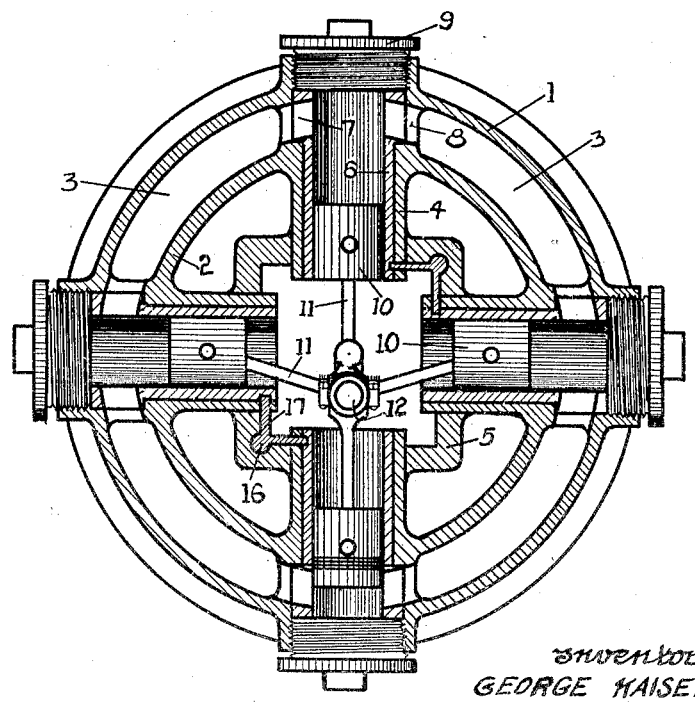

Patented Feb. 13, 1923.

1,445,323

UNITED STATES PATENT OFFICE.

GEORGE KAISER, OF ST. LOUIS, MISSOURI.

TRANSMISSION MECHANISM.

Application filed March 2, 1921. Serial No. 449,063.

*To all whom it may concern:*

Be it known that I, GEORGE KAISER, a citizen of the United States, and residing at St. Louis, Missouri, have invented the new and useful Improvement in Transmission Mechanism, of which the following is a specification.

This invention relates to transmission mechanism, and more particularly to that class of gearing designed to provide a releasable connection between the driven machinery and the driving source. A well known example of such gearing is the clutch of an automobile, and this invention is particularly designed for use in place of the clutch of an automobile.

It is well known that clutches of the various standard designs have one very undesirable feature, in that they are liable to grip too suddenly so as to start the connected load with a jerk which, in the case of an automobile particularly, is decidedly disagreeable.

One of the objects of this invention, therefore, is to provide means for connecting a driving source with its load in such a way that the load may be started gradually and without jerking.

Another object of this invention is to provide such a connection in which the rapidity with which the device picks up the load can be accurately controlled by the operator.

Further objects will appear from the detail description taken in connection with the accompanying drawings, in which:

Figure 3 is a section on line 3—3, Figure 1; and

Figure 4 is a detail of the means for operating the valves.

Figure 5 is a detail of the valve.

Figure 1:
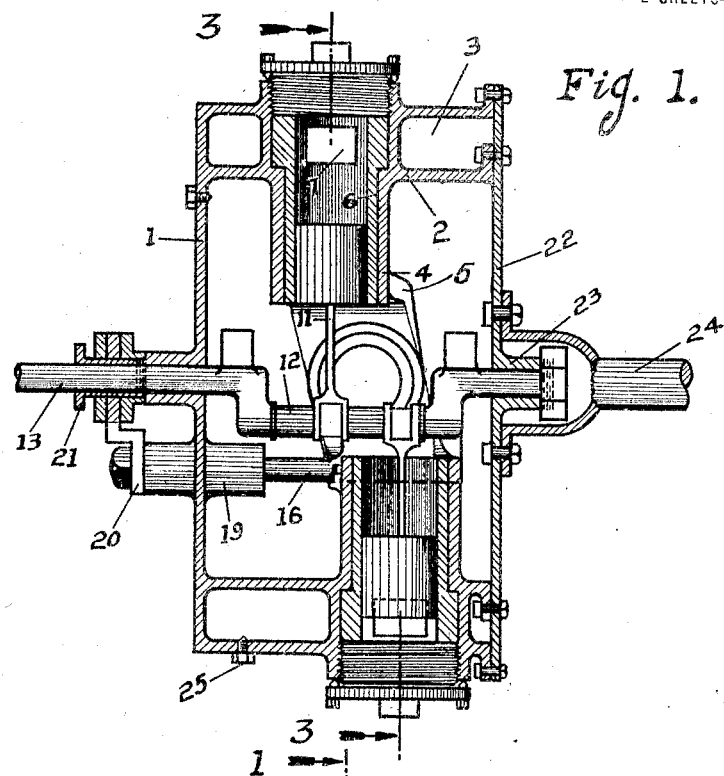
Figure 1 is a cross-sectional view of a device embodying this invention, taken on line 1—1, Figure 2.
Figure 2:
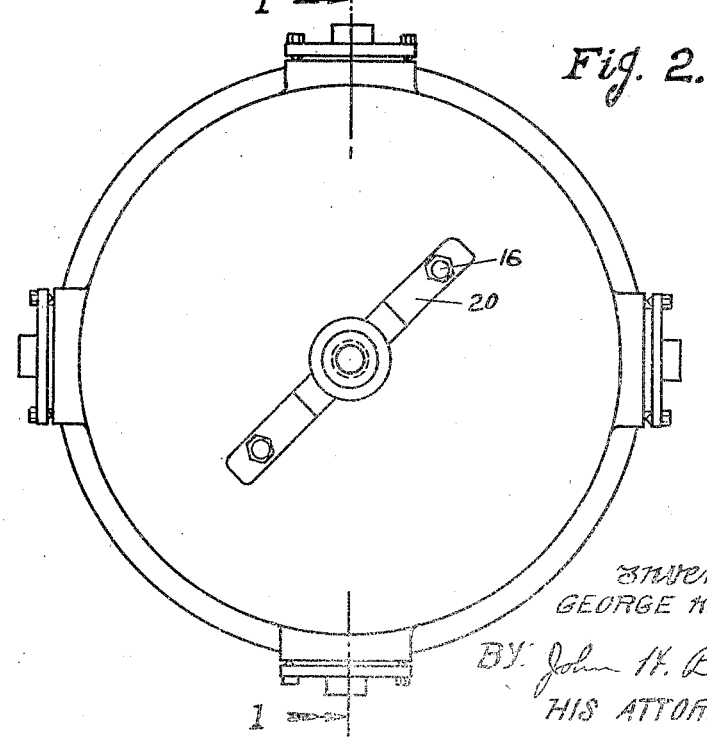
Figure 2 is an end elevation of Figure 1.

Referring to the drawings, 1 designates a housing which may be cylindrical in form. The housing 1 is provided with a partition 2 forming an outer annular chamber 3. A series of cylinders 4 are formed integral with the housing and have their axes extending radially toward the axis of the housing. The inner ends of the cylinders 4 may be connected by means of a web 5 adapted to additionally support the ends of the cylinders and to render them rigid.

The cylinders 4 are bored to receive sleeve valves 6 fitted to the cylinders and having ports 7 adapted to communicate with the adjacent ports 8 opening through the cylinder walls to communicate with the chamber 3. These valves are so arranged that they may be rotated within the cylinders so as to move the ports 7 out of registry with the ports 8, thereby cutting off communication between the interior of the valves 6 and the chamber 3. Each valve is held in place by a suitable plug 9. The interior of each valve is bored to receive a piston 10 which may be of any usual construction and adapted to work within the sleeve 6. Each piston 10 is connected by means of a pitman 11 to the crank 12 of the crank shaft 13.

The axes of the cylinders 4 are off-set with respect to one another along the axis of the housing so that the several pitmen 11 may be connected side by side to the same crank 12. By this construction, it will be evident that when the shaft 13 is rotated with respect to the housing 1, the pistons 10 will all work back and forth in their respective cylinders with a difference of phase of one-quarter of a revolution.

Each valve 6 is provided at its inner extremity with gear teeth about a portion of its circumference. Slidably mounted in the web 5 are two double racks having the form shown in Figure 4 in which a common shank 16 carries two racks 17 extending therefrom at right angles to each other. These racks 17 are provided with teeth 18 adapted to mesh with the gear teeth 14 of the valves. The shanks 16 of these racks are slidably mounted in sleeves 19 in the housing and are connected exteriorly to the housing by a yoke 20 suitably connected to a sleeve 21 slidably mounted on the shaft 13. The operating lever or foot-pedal may be connected in any usual manner to the sleeve 21. A cover-plate 22 is provided for the housing 1 and carries a suitable bearing 23 for the end of the crank shaft 13. A shaft 24 may be connected in any suitable manner to the plate 22. Either of the shafts 13 or 24 may then be a driving shaft and the other will either be driven thereby or will be allowed to remain stationary according to the manner in which the valves 6 are operated.

The operation of the device is as follows:

With the ports 7 and 8 open the chamber 3 and the interior of the cylinders are filled with oil or other suitable fluid. This may be done by removing the plug 25 provided for that purpose. When the chamber is filled completely full, the plug 25 is again inserted to seal the chamber. With the chamber 3 and the cylinders 4 full of oil and the ports 7 and 8 open, if, say the shaft 13 be rotated, the housing will remain stationary, being held by the load connected to the shaft 24 and the pistons 10 will work back and forth in the cylinders, and by such movement will cause the oil to circulate back and forth between the cylinders and through the chamber 3. If now by movement of the racks 17, the valves are partly closed, it being understood that said valves are arranged to work substantially in unison, the flow of oil from one cylinder to another through the chamber 3 will be retarded with the result that the relative movement between the crank shaft 13 and the housing 1 will be retarded by the resistance to the movement of the pistons 10. The result of this will be that a torque will be exerted upon the housing 1 and will be transmitted to the shaft 24. When the valves 6 are closed to a sufficient extent this torque will become great enough to start the load connected to the shaft 24, which load will then be driven at a speed less than that of the shaft 13 according to the extent of the port openings adjusted by the valves. Upon completely closing the valves 6, the oil within any cylinder will be trapped therein and unable to escape with the result that relative movement between the pistons 10 and the cylinders 4 will be impossible, and the housing 1 will then be carried around by the shaft 13 and the speed of the shaft 24 will be equal to the speed of the shaft 13.

It will be seen, therefore, that this invention accomplishes its objects. By adjustment of the port openings 7 and 8, the retardation to the circulation of oil between the cylinders may be adjusted to any desired point, and the "slip" of the housing 1 relatively to the shaft 13 may be adjusted thereby.

It is obvious that various changes may be made in details of construction without departing from the spirit of this invention; it is, therefore, to be understood that this invention is not to be limited to the specific details shown and described.

Having thus described the invention, what is claimed is:

1. Transmission mechanism, comprising, a revoluble housing constructed to provide a chamber and cylinders, sleeve valves in said cylinders adapted to control communication between said cylinders and said chamber, pistons working in said valves, a crank shaft connected with said pistons, and means for operating said valves.

2. Transmission mechanism, comprising, a revoluble housing constructed to provide a chamber and cylinders, sleeve valves in said cylinders adapted to control communication between said cylinders and said chamber, pistons working in said valves, a crank shaft connected with said pistons, and means extending exterior of said housing for operating said valves.

3. Transmission mechanism, comprising, a revoluble housing constructed to provide a chamber and cylinders, sleeve valves revolubly mounted in said cylinders adapted to control communication between said cylinders and said chamber, pistons working in said valves, a crank shaft connected with said pistons, and means for operating said valves.

4. Transmission mechanism, comprising, a revoluble housing constructed to provide a chamber and cylinders, sleeve valves in said cylinders adapted to control communication between said cylinders and said chamber, teeth on said valves, racks adapted to engage said teeth to operate said valves, pistons working in said valves, a crank shaft connected with said pistons, and means for moving said racks to operate said valves.

5. Transmission mechanism, comprising, a revoluble housing constructed to provide a chamber and cylinders, sleeve valves in said cylinders adapted to control communication between said cylinders and said chamber, teeth on said valves, a rack adapted to engage said teeth to operate several of said valves, pistons working in said valves, a crank shaft connected with said pistons, and means for moving said racks to operate said valves.

6. Transmission mechanism, comprising, a revoluble housing constructed to provide a chamber and cylinders, sleeve valves in said cylinders adapted to control communication between said cylinders and said chamber, teeth on said valves, a web connecting said cylinders, a rack on said web adapted to engage said teeth to operate said valves, pistons working in said valves, a crank shaft connected with said pistons, and means for moving said racks to operate said valves.

In testimony whereof I affix my signature this 23rd day of Feb., 1921.

GEORGE KAISER.